(12) United States Patent
Bivens et al.

(10) Patent No.: US 7,890,624 B2
(45) Date of Patent: *Feb. 15, 2011

(54) METHOD FOR REDUCING VARIABILITY AND OSCILLATIONS IN LOAD BALANCING RECOMMENDATIONS USING HISTORICAL VALUES AND WORKLOAD METRICS

(75) Inventors: John A. Bivens, Ossining, NY (US); Donna N. Dillenberger, Yorktown Heights, NY (US); Yuksel Gunal, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/146,707

(22) Filed: Jun. 26, 2008

(65) Prior Publication Data

US 2008/0263206 A1 Oct. 23, 2008

Related U.S. Application Data

(63) Continuation of application No. 11/348,046, filed on Feb. 6, 2006, now Pat. No. 7,647,405.

(51) Int. Cl.
*G06F 15/173* (2006.01)
(52) U.S. Cl. ........................... 709/224; 709/223
(58) Field of Classification Search ......... 709/201–203, 709/220–226, 235
See application file for complete search history.

(56) References Cited

U.S. PATENT DOCUMENTS

| | | | | |
|---|---|---|---|---|
| 6,571,288 B1 * | 5/2003 | Sarukkai | | 709/226 |
| 6,862,623 B1 * | 3/2005 | Odhner et al. | | 709/226 |
| 7,305,471 B2 * | 12/2007 | Odhner et al. | | 709/226 |
| 7,313,620 B2 * | 12/2007 | Odhner et al. | | 709/226 |
| 7,610,381 B2 * | 10/2009 | Cherkasova et al. | | 709/226 |
| 2005/0005012 A1 * | 1/2005 | Odhner et al. | | 709/226 |
| 2005/0120095 A1 | 6/2005 | Aman et al. | | |
| 2005/0228879 A1 * | 10/2005 | Cherkasova et al. | | 709/224 |

OTHER PUBLICATIONS

Cisco System, Catalyst 6000 Family Content Switching Module Installation and Configuration Note, 2001, Features p. 3. Cisco Systems, Inc. San Jose, CA.
CSS Basic Configuration Guide; 2001; Chapter 3, pp. 3-16; Chapter 5, pp. 5-7, Chapter 7, pp. 7-24-7-25; 7-51-7-53; Cisco Systems, Inc. San Jose, CA.
CSS Advanced Configuration Guide; 2003; Chapter 13, pp. 13-1-13-5. Cisco Systems, Inc. San Jose, CA.
Alteon OS 22.0.2 Application Guide; 2005; Chapter 10, pp. 181-187; pp. 195-199; pp. 202-203; pp. 210-218. Nortel Networks, Inc., Santa Clara, CA.

* cited by examiner

*Primary Examiner*—Yemane Mesfin
(74) *Attorney, Agent, or Firm*—Scully, Scott, Murphy & Presser, P.C.

(57) ABSTRACT

The present invention provides a method of preventing harmful variability and oscillation in weight based, dynamic load balancing environments. More specifically, the present invention relates to methods to effectively determine the magnitude of weight changes in dynamic load balancing environments based on the workload magnitude and server farm capacity. This method depends on the development of new multi-system characteristics such as a relative workload metric to characterize the workload of the system relative to the collective capacity of all of the systems to handle the workload.

14 Claims, 6 Drawing Sheets

METHOD FOR REDUCING VARIABILITY AND OSCILLATIONS IN LOAD BALANCING RECOMMENDATIONS USING HISTORICAL VALUES AND WORKLOAD METRICS

RELATED APPLICATIONS

This application is a continuation of U.S. Ser. No. 11/348,046, filed Feb. 6, 2006, the entire contents of which are incorporated herein by reference.

BACKGROUND OF THE INVENTION

1. Technical Field

The present invention provides a method of preventing harmful variability and oscillation in weight based, dynamic load balancing environments for distributing loads or service requests to a collection of computer servers or a server farm. More specifically, the present invention relates to methods to effectively determine the magnitude of weight changes in dynamic load balancing environments based on the workload magnitude and server farm capacity.

2. Description of Related Art

Copending U.S. patent application of Aman et al., Ser. No. 10/725,635, entitled: "Apparatus and Method for Determining Load Balancing Weights Using Application Instance Statistical Information", filed Dec. 2, 2003, assigned to the International Business Machines Corporation, is incorporated herein by reference. This published patent application teaches a method of generating weights using application statistics.

Load balancers distribute load to a collection of machines to provide extended scalability and availability to applications. In large enterprise environments, multiple copies of applications on the machines or servers are used to service high numbers of requests and transactions. These environments use load balancers to distribute the incoming requests across the multiple copies of the enterprise application. Technologies such as the Server/Application State Protocol (SASP) enable third party products to continually advise the load balancers as to how incoming connections should be distributed. Distribution recommendations may be in the form of numerical weights where each weight represents the relative proportion of connections that should be given to a particular server or application. Many of the third party products that compute these dynamic weights do so based on current statistics related to the performance and resources used by the systems and applications in the server farm. The problem created by this type of computation is that various statistical measurements may cause a particular system or application to be heavily weighted at one point in time. When this happens under heavy load, an individual system can quickly be heavily loaded, causing the resulting statistical measurements to heavily favor another system. The result is an oscillating behavior where weights can heavily swing from one server or application to another. This oscillation causes degradation in the performance of the server farm.

Because of their limited insight into application and system performance, typical load balancers use static weights. Of the few instances where dynamic weights are used, there are no methods for reducing oscillations in the dynamic weights. While we have not found methods to reduce oscillation and variability in dynamic load balancing environments, there are methods of reducing oscillatory behavior in mathematical convergence techniques in the general field of mathematics. In these strategies, solutions are approached in steps. If the step is too small, the solution may take too long to reach. If the step is too large, oscillatory behavior can be seen around the solution. While we also look to avoid oscillatory behavior, our problem is different. In the dynamic load balancing environment, "the solution" would be the proper set of weights and this "solution" would be constantly changing. The anti-oscillatory methods in the mathematical convergence techniques in the general field of mathematics are to prevent the algorithm from oscillating around a static solution. These techniques usually involve some type of momentum characteristic to push the algorithm out of these oscillations and closer to the goal. In the dynamic load balancing case, the goal would change by the time the momentum was applied possibly causing an action in an undesired direction. The other problem with the mathematical convergence oscillatory prevention mechanisms is that they may require significant changes to existing weight generation products, such as workload managers.

There is, therefore a need to achieve a balance between very conservative weight changes that will react very slowly to server farm or workload changes and large weight changes that will react too abruptly to server farm or workload changes.

SUMMARY OF THE INVENTION

Accordingly, it is an object of this invention to achieve a balance between very conservative weight changes that will react very slowly to server farm or workload changes and large weight changes that will react too abruptly to server farm or workload changes.

The present invention provides a method of preventing harmful variability and oscillation in weight based, dynamic load balancing environments.

More specifically, one aspect of the present invention relates to methods to effectively determine the magnitude of weight changes in dynamic load balancing environments based on the workload magnitude and server farm capacity. That is, the factor by which the actual weights will be changed is based on a "relative workload" metric indicating the ability of the entire server farm to handle the incoming work. This method depends on the development of new multi-system characteristics such as a relative workload metric to characterize the workload of the system relative to the collective capacity of all of the systems of the server farm to handle the workload. This technique permits heavier weight changes only when the server farm can handle them.

Another aspect of this invention treats the new weights generated as an indication of how the old weights changed, thereby incorporating a sense of history in the suggested distributions so that the appropriate "solution" is gradually converged to. This will reduce any oscillatory performance while assuring steps are being made in the right direction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Figure 1:
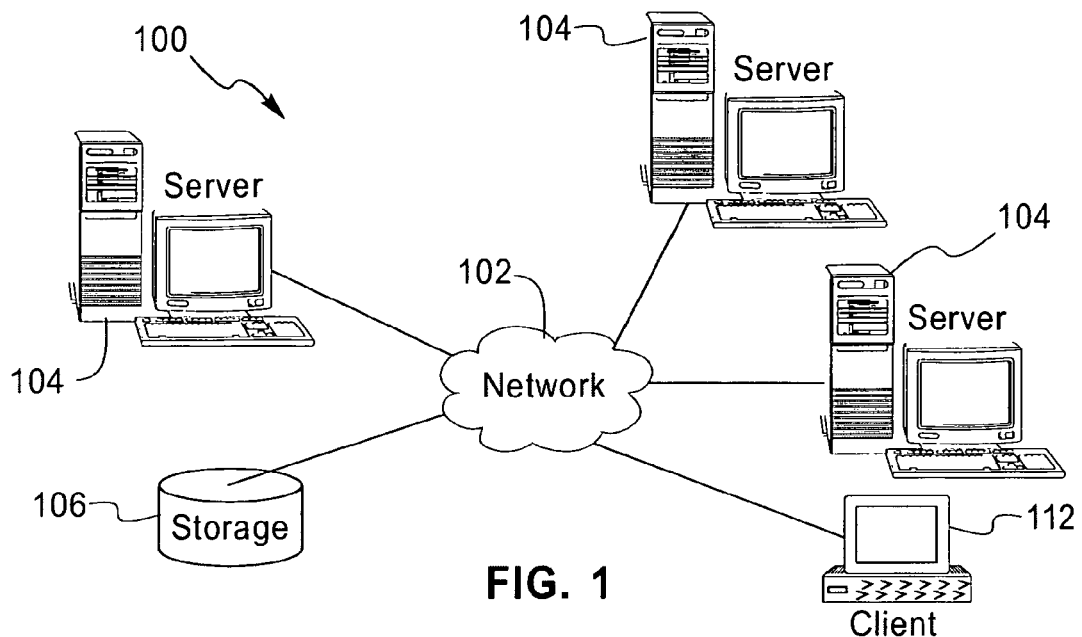
FIG. 1 is an exemplary diagram of a distributed data processing environment in which the present invention may be implemented.
Figure 2:
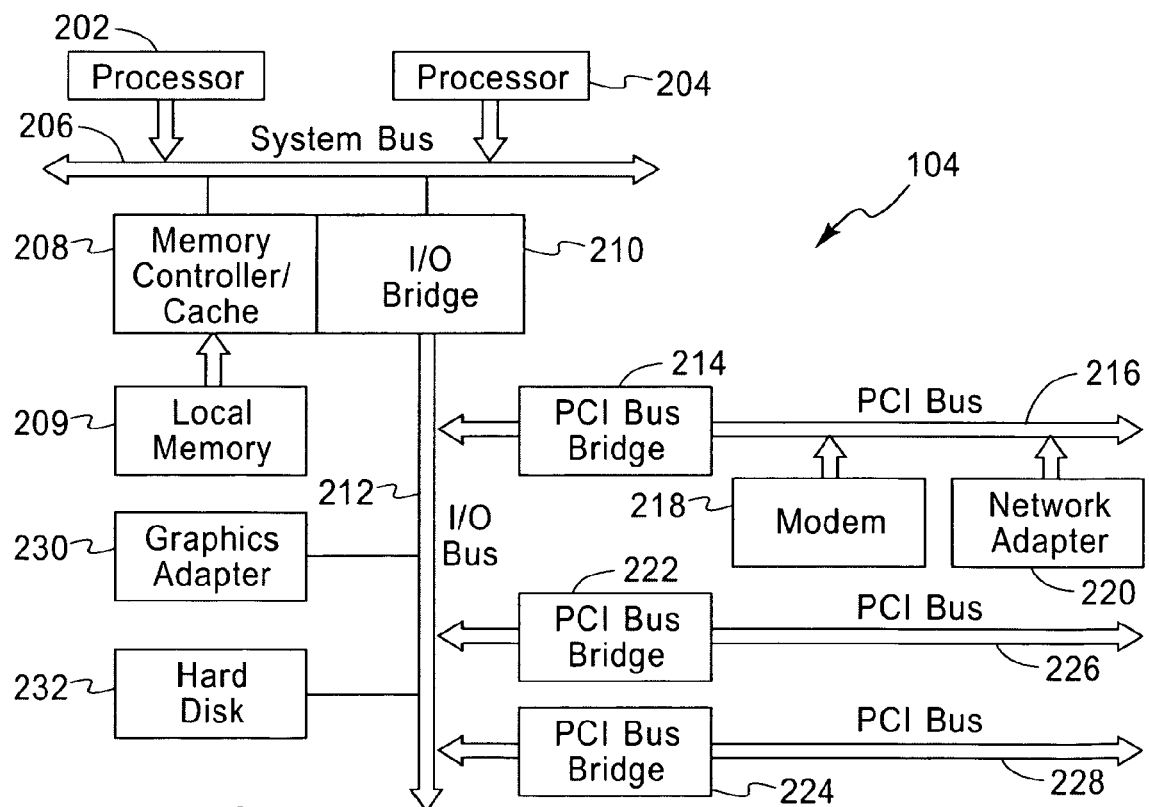
FIG. 2 is an exemplary diagram of a server computing device in which aspects of the present invention may be implemented.
Figure 3:
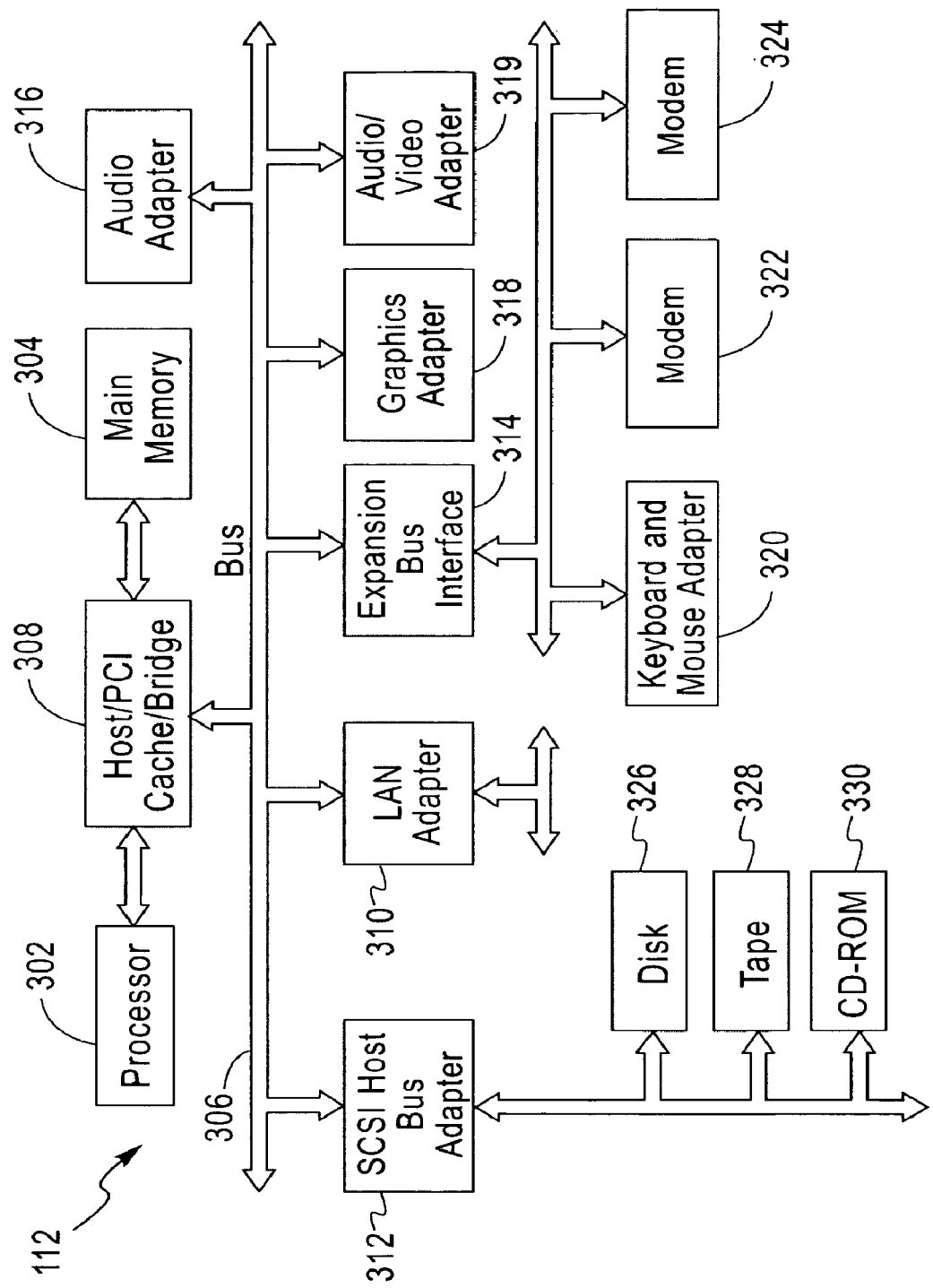
FIG. 3 is an exemplary diagram of a client computing device in accordance with an exemplary embodiment of the present invention.

The present invention is directed to a mechanism for performing load balancing of requests to application instances on one or more server computing devices. These requests may be generated by other servers, client computing devices, or other computing devices that may act as sources of requests for application resources on a server computing device. As such, the present invention is especially suited for use in a distributed data processing environment. Therefore, FIGS. 1-3 are provided hereafter to provide a general overview of an exemplary distributed data processing system, and the computing devices therein, in order to give a context for an exemplary environment in which the present invention may be implemented. No limitation on the environments in which the present invention may be utilized is intended or implied by the description and depictions of FIGS. 1-3.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104 are connected to network 102 along with storage unit 106. In addition, client 112 is connected to network 102. Client 112 may be, for example, a personal computer or network computer. In the depicted example, servers 104 provide data, such as boot files, operating system images, and applications to client 112. Client 112 maybe a client to one of the servers 104, for example. Network data processing system 100 may include additional servers, clients, and other devices not shown. In the depicted example, network 102 of the may include the Internet representing a worldwide collection of networks and gateways that use the Transmission Control Protocol Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network 102 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented for anyone of the servers 104 in FIG. 1, is depicted in accordance with a preferred embodiment of the present invention. Data processing system 104 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 104 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 112 is an example of a client computer. Data processing system 112 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

Figure 4:
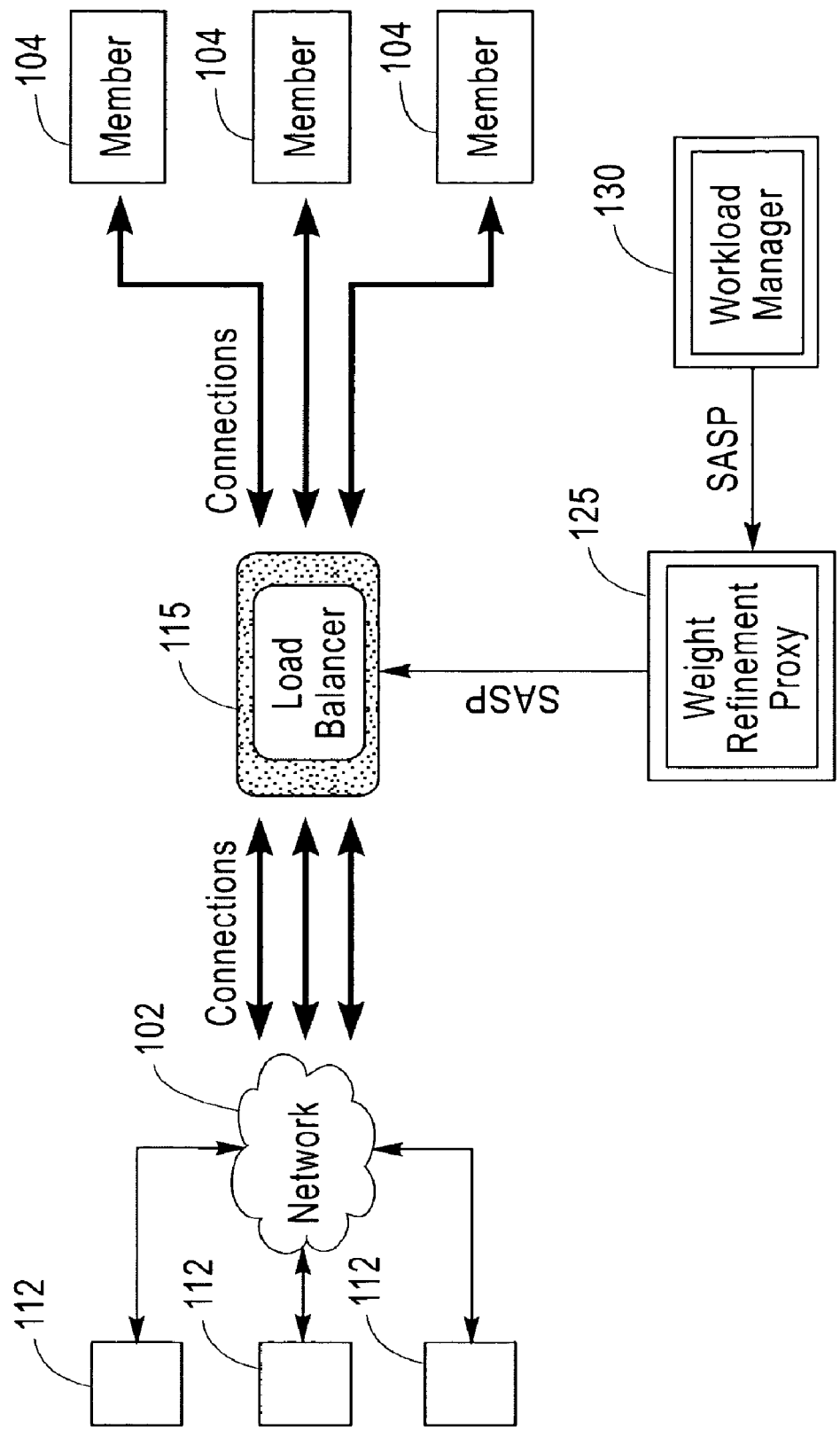
FIG. 4 is an exemplary diagram of a distributed data processing environment in which the load balancer and weight refinement proxy for the present invention may be implemented.

The present invention addresses the issue of oscillatory behavior in load balancing weights. Our goal is to change weights in a dynamic load balancing environment in a manner that will reduce oscillations in server farm performance while assuring that weights are still capable of reacting to problems in a timely fashion. This technique may be applied to existing load balancing advisors with very little change to the base weight calculation or it may be integrated directly into the load balancing advisor's implementation. FIG. 4 shows an example of a load balancing environment where the present invention can be used. In this figure, the incoming requests from clients 112 are forwarded over network 102 to the content servers (104) by the load balancer (115). Conventional load balancers, such as those from CISCO or Nortel may used. FIG. 4, illustrates an environment where a weight refinement proxy (125) sits between the workload manager or weight generation component (130) and the load balancer (115). One such example of a workload manager is IBM's Enterprise Workload Manager. In this case, the load balancer would be made to think that the weight refinement proxy is the workload manager, and the weight refinement proxy will act as a load balancer to the workload manager. This would allow the weight refinement proxy to receive the weights from the workload manager and refine them according to the methods of this invention before rendering them to the load balancer. Alternatively, if the present invention is integrated into the weight generation component, it will be integrated to the algorithm of the workload manager or weight generation component (130), and the weight refinement proxy would not be needed.

Two aspects of the invention that will be described below are: determined weights to using weight history, and determining weights using a metric know as the relative workload of the computing environment.

Incorporating Weight History into Existing Weights

The first mention aspect above of the present invention will be described in the context of an interval-based management loop to generate weights to use as load balancing recommendations. In this context, a workload manager will compute new load balancing weights at every interval. When describing our approach to incorporating weight history into existing weights, the following terms must be defined:

$old\_weight_i$: The weight assigned to members in the previous weight generation interval.

$new\_raw\_weight_i$: The un-refined weight generated for $member_i$ for the current weight generation interval. Raw weights are calculated using existing weight generators.

$sub\_delta_i$: An amount that is to be reallocated from $member_i$ during this weight generation interval.

$add\_delta_i$: The amount reallocated to $member_i$ during this weight generation interval.

WeightPool: The total amount of weight aggregated from all members to be reallocated.

$final\_weight_i$: The final weight assigned to $member_i$.

Figure 5:
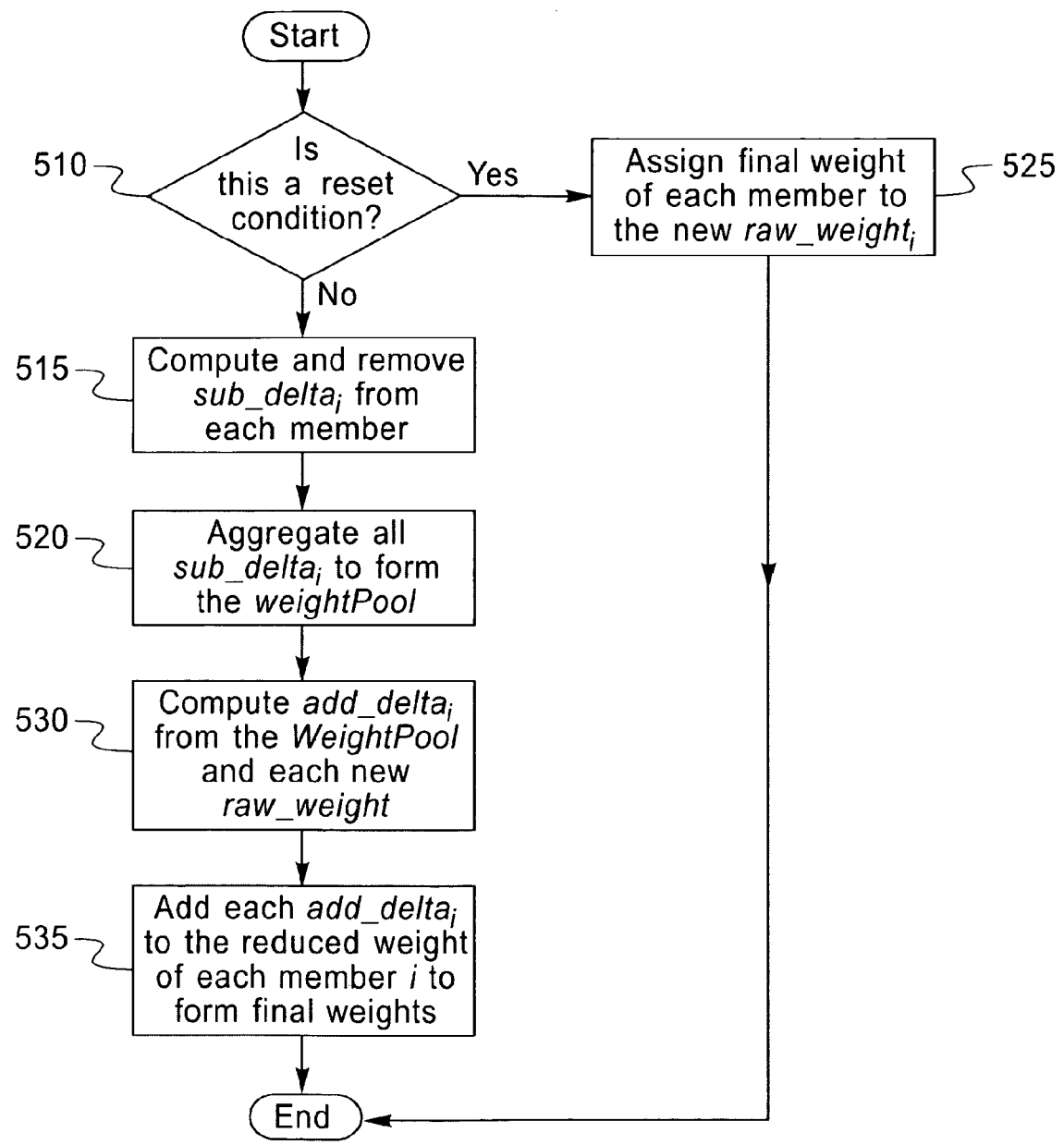
FIG. 5 is an exemplary diagram of the process by which historical weight values may be used to form new weights.

The strategy, as illustrated in the flowchart of FIG. 5, incorporates history into the final weights sent to the load balancer. However, there are several cases where the weight history is no longer relevant or it is simply incompatible. These cases are referred to as reset conditions and they include (but are not limited to) the following:

When the algorithm is producing the first set of weights

When group members are added/removed

When group members are quiesced/reactivated

When new load balancing algorithms or modes are engaged.

If during the management loop, it is determined that there is a reset condition (510), the new raw weights will be used as the final weights (525). Other ways of handling the reset conditions would be to reinitialize all weights to a common value or some function of historic averages or trends.

If there is no reset condition, the old weights are changed in accordance with the distribution indicated by the new raw weights. This process involves the following steps:

1. Calculate and remove an amount of weight ($sub\_delta_i$) from each group member's old weight (515). One way of calculating this amount is by taking away a fixed percentage of each member's old weight:

$$sub\_delta_i = old\_weight_i * WeightDelta$$

More intelligent methods of computing sub_delta will be described below.

2. Add all $sub\_delta_i$ values to form WeightPool (520)

3. Calculate the portion of the WeightPool ($add\_delta_i$) that will be attributed back to each of the respective members. When redistributing the WeightPool in this fashion, it should be divided in accordance to the distribution suggested by the new raw weights for this particular interval (530). For example, add_delta, for member i can be computed by proportionally dividing the WeightPool in the following manner:

$$add\_delta_i = \frac{new\_raw\_weight_i}{\sum_{j=0}^{n} new\_raw\_weight_j} \times WeightPool$$

4. Add $add\_delta_i$ to the reduced old weight of $member_i$ (computed in 515) to form the $final\_weight_i$ (535). This process could be described mathematically as the following:

$$final\_weight_i = old\_weight_i - sub\_delta_i + add\_delta_i$$

While the implementation of FIG. 5 described above will reduce the amount of variability in load balancing weights and introduce an aspect of history in the weights used, the inventors have discovered that the magnitude and effect of a weight change is also dependant on the current workload. Even when the workload is large, if the capacity of the server farm is much larger, significant weight changes may be safe. If the workload is high when compared with the capacity of the server farm, the managing applications could cause oscillatory performance by even moderately favoring a particular machine, discovering it is now swamped and then favoring a new machine. To avoid this type of behavior, one must consider the magnitude of the current workload relative to the server farm capacity when deciding how much to change the weights. To describe this approach, the following variables are defined:

relative_workload: metric characterizing the current workload with respect to the system's capacity to handle this workload.

Figure 6:
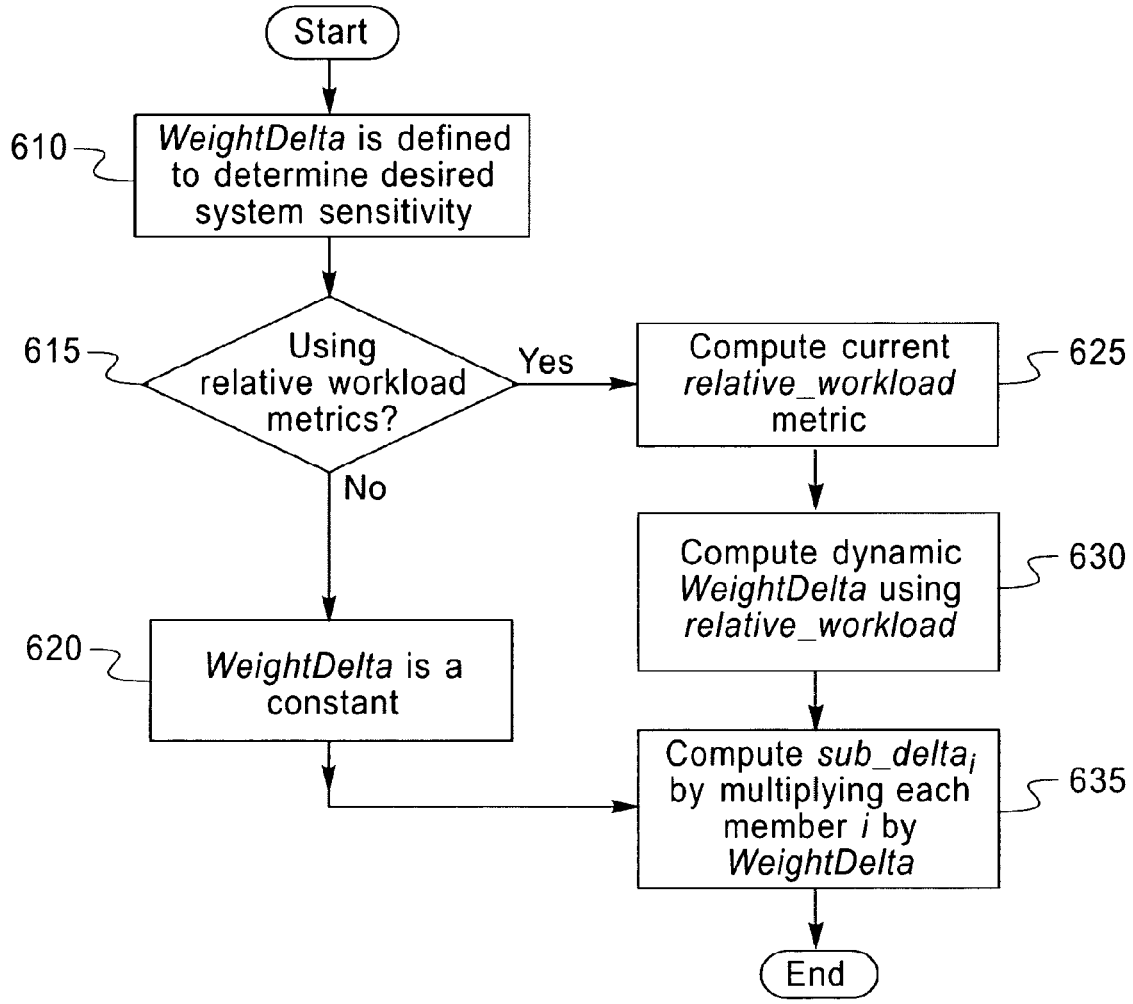
FIG. 6 is an exemplary diagram of the process by which the rate of change is determined using a relative workload metric.

The objective of the following text is to determine this relative_workload metric and use it to change the amount of the weights that will be reallocated during each weight computation interval. A description of computing new weights in this fashion would resemble the flowchart and description in FIG. 5 with more intelligent logic for the computation of $sub\_delta_i$ (515). The new method of calculating $sub\_delta_i$ is described in FIG. 6 and the paragraph below.

Described above as an implementation of step 515, $sub\_delta_i$ can be computed by multiplying old weights by WeightDelta (610), a parameter which determines how sensitive the change in weights will be to the current conditions. In this implementation, if WeightDelta is zero, the weights would never change (no sensitivity to current conditions).

Conversely, as WeightDelta approaches 1, the weights will begin to mirror the exact conditions seen when statistics are sampled (in some cases this may be too sensitive). An earlier description used a constant value for WeightDelta (615, 620). For static WeightDelta values, conservative numbers within the range of 5 to 10% may be appropriate. To determine a more appropriate value for WeightDelta, the relative_workload metric (615, 625) is used. Once the relative_workload metric is computed, WeightDelta can then be computed dynamically as a function of the relative_workload (625, 630). An example of this computation is noted below:

$$WeightDelta = \frac{WeightDeltaMax}{relative\_workload} \times c$$

where:

WeightDeltaMax=the largest weight change the implementer permits. This is again a factor of how conservative the implementor is. A typical value for WeightDeltaMax is 75% (0.75). The implementer should prevent value of the relative workload from falling below 1.0 in the above formula to adhere to the WeightDeltaMax cap.

c=constant used to assist in the computation of the WeightDelta. c was chosen to be 1 in this embodiment, however, other values may be used.

The new values of $sub\_delta_i$ can then be computed by multiplying old weights by the new dynamic WeightDelta value (635).

Methods of computing the Relative Workload Metric

The relative_workload metric is a representation of the relationship between the current workload and the system's capacity to handle this workload. This metric can be expressed at a high level by the following formula:

$$relative\_workload = \frac{workload\_volume}{serverfarm\_capacity}$$

This value can be particularly difficult to compute because there are not easy ways to calculate the "server farm capacity" as it pertains to a specific application at any point in time. Even if computed, the metrics that many may use to calculate the "server farm capacity" may not be in terms of or comparable to the "workload volume." Lastly, the capacity could change if other applications are started or stopped in the server farm as well as when resources are dynamically provisioned to the farm. Instead of trying to compute this metric, it is estimated. Essentially, measurement or computation of other statistics that have some relationship to the relative_workload metric may be used or substituted in its place. It is important to note, that while we describe a number of methods to estimate the relative_workload metric, this invention is not limiting its claims to these methods.

Application Queue Metrics

One way of estimating the relative workload metric is to monitor application level work queues. The application queue sizes are a direct result of the workload and the capacity of the farm. In a load balancing environment where there are many copies of the application, each application instance may have its own work queue. In this case we need to form a consolidated queue metric by statistically combining the queue sizes from each application queue with respect to the weights used when distributing the work.

An example of this calculation would start with determining the weight-based coefficient to use for each application queue size:

$$Coef_x = \frac{Weight_x}{\sum_{i=0}^{n} Weight_i}$$

where:

x=the particular application x n=the set of all applications $Weight_x$ and $Weight_i$ are functions of historical weights.

The rest of the consolidated queue metric would look like the following:

$$QueueMetric = \sum_{i=0}^{n} Coef_i \times AppQueueSize_i$$

This queue metric is not exactly the same as the relative workload metric; however, it is related. When the queue metric is higher, the relative workload metric is higher. Its relationship to the relative_workload is characterized in the following formula where x is a constant:

RelativeWorkload*x=QueueMetric

Oscillating Performance Metrics

A second method of estimating the relative workload metric is to work backwards and monitor the oscillatory performance caused when weights change. Performance metrics would be maintained over several weight updates and the sampled performance would be compared. The performance deviation (standard deviation computation) of the different load balanced paths during this time period can be used as an oscillation metric. An example of such a calculation is found below:

$$PerfDev(i) = \frac{\%\ perfChange(i)}{\%\ weightChange(i)}$$

where:

PerfDev(i)=The performance deviation for a load balanced particular path i.

% perfChange(i)=The percentage of change in the performance of path i.

% weightChange(i)=The percentage of change in the weight of path i.

Some performance metrics that may exhibit this behavior are the current number of transactions being processed or the response times of the transactions during that time period. Each perfDev(i) can be statistically combined to form a consolidated deviation metric for the server farm (using a weighted average, etc.). A similar calculation using resource oriented statistics (cpu utilization, etc.) could also be used. The performance deviation may be multiplied an appropriate constant, such as 1, to determine the relative workload.

CPU Delay Metrics

A third method of estimating relative_workload is by using the system's or application's CPU delay. This metric is an indication of how busy the system is while processing the current work. If the CPU delay gets smaller, the relative workload should be smaller. As the CPU delay grows bigger, the workload is becoming larger than the system's ability to handle it. The CPU could be multiplied by appropriate constants to insure that the relative work load assumes a certain range of values.

Figure 7:
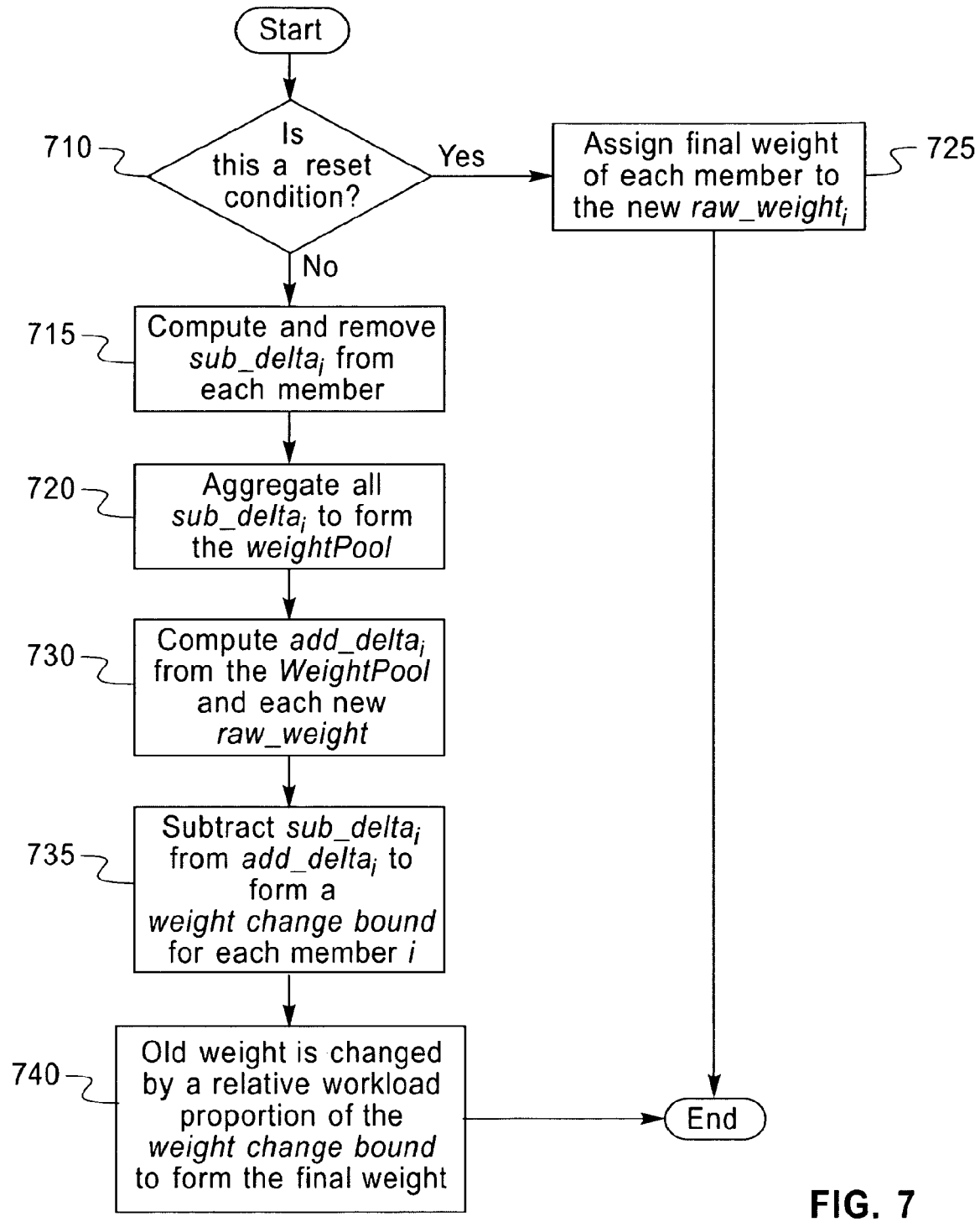
FIG. 7 is an exemplary diagram illustrating a second process by which the rate of change is determined using a relative workload metric.

Alternatively, FIG. 7 describes a different method of taking relative_workload into account when computing new weights. This alternative process begins as the process in FIG. 5 began, by determining if the system was in a reset condition (710). If the system is determined to be in a reset condition, the final weight of each member would be set to its corresponding new raw_weight, or some other preset value (725). If the system is determined to not be in a reset condition, the process proceeds to computing and removing sub_delta$_i$ from each member's old_weight by using a constant value of WeightDelta (715):

$$sub\_delta_i = old\_weight_i * WeightDelta$$

All sub_delta$_i$ will be added together to form WeightPool (720). The add_delta values would then be computed as the portion of the WeightPool that will be attributed back to each of the respective members. When redistributing the Weight-Pool in this fashion, it should be divided in accordance to the distribution suggested by the new raw weights for this particular interval (730). For example, add_delta, for member i can be computed by proportionally dividing the WeightPool in the following manner:

$$add\_delta_i = \frac{new\_raw\_weight_i}{\sum_{j=0}^{n} new\_raw\_weight_j} \times WeightPool$$

The value add_delta$_i$ is then contrasted with the value subtracted from the weight of member i, sub_delta$_i$ to form a weight change bound (735) which represents the maximum change in weight for the member i. This process could be described mathematically as the following:

$$weightchange\_bound_i = add\_delta_i - sub\_delta_i$$

To make the actual change relative to the workload and its relationship to the server farm capacity, we will only change the weight by a factor of the weightchange_bound and the relative_workload (740):

$$final\_weight_i = old\_weight_i + (relative\_workload * C) * weightchange\_bound_i$$

C was chosen to be 1 in this embodiment, however, other values may be used.

What is claimed is:

1. A method of determining weights to be used for load balancing in a server farm computer system, said method comprising:
   estimating a relative workload, which is characteristic of the workload of said system relative to the capacity of said system;
   calculating, by a processor, said weights using said estimated relative workload; and
   calculating said weights using weight history,
   wherein each of said weights are calculated by subtracting a portion of a previous corresponding weight of said weights by a first number which is proportional to said relative workload and then adding a second number which is a function of said first numbers.

2. A method as recited in claim 1, wherein said relative workload is estimated using work queue sizes for requests to said system.

3. A method as recited in claim 1, wherein said relative workload is estimated using oscillation metrics as a function of changes in said weights, wherein said oscillation metrics is a measure of resource usage deviation as a function of changes in said weights.

4. A method as recited in claim 1, wherein said relative workload is estimated using oscillation metrics as a function of changes in said weights, wherein said oscillation metrics is a measure of performance as a function of changes in said weights.

5. A method as recited in claim 1, wherein said relative workload is estimated using CPU delay metrics.

6. A method as recited in claim 1, wherein said weights are calculated by changing existing weights based upon said relative workload.

7. A non-transitory program storage device readable by a machine, tangibly embodying a program of instructions executable by the machine to perform method steps for determining weights to be used for load balancing in a server farm computer system, said method comprising:
   estimating a relative workload, which is characteristic of the workload of said system relative to the capacity of said system;
   calculating said weights using said estimated relative workload; and
   calculating said determined weights using weight history, wherein each of said determined weights are calculated by subtracting a portion of a previous corresponding weight of said weights by a first number which is proportional to said relative workload and then adding a second number which is a function of said first numbers.

8. A program storage device as recited in claim 7, wherein said relative workload is estimated using work queue sizes for requests to said system.

9. A program storage device as recited in claim 7, wherein said relative workload is estimated using oscillation metrics as a function of changes in said weights, wherein said oscillation metrics is a measure of resource usage deviation as a function of changes in said weights.

10. A program storage device as recited in claim 7, wherein said relative workload is estimated using oscillation metrics as a function of changes in said weights, wherein said oscillation metrics is a measure of performance as a function of changes in said weights.

11. A program storage device as recited in claim 7, wherein said relative workload is estimated using CPU delay metrics.

12. A program storage device as recited in claim 7, wherein said determined weights are calculated by changing existing weights based upon said relative workload.

13. A method of determining weights to be used for load balancing in a server farm computer system claimed in claim 1, further comprising:
   changing existing weights based upon weight history used by a distribution entity for distributing client requests to servers of said system, wherein said changed weights are said determined weights.

14. A system for distributing client requests to at least one of a plurality of servers in a server farm, said system comprising:
   a processor;
   a load balancer for receiving said client requests and forwarding said requests to selected ones of said servers;
   a workload manager for generating first weights; and a weight refinement proxy for estimating a relative workload, which is characteristic of the workload of said system relative to the capacity of said system and for refining said first weights to second weights by using said estimated relative workload, wherein said second weights are used by said load balancer in determining which of said servers are to receive which of said client requests, the weight refinement proxy for further calculating said weights using said estimated relative workload, and calculating said determined weights using weight history, wherein each of said determined weights are calculated by subtracting a portion of a previous corresponding weight of said weights by a first number which is proportional to said relative workload and then adding a second number which is a function of said first numbers.

* * * * *